United States Patent
Kraayenbrink et al.

(10) Patent No.: US 10,052,920 B2
(45) Date of Patent: Aug. 21, 2018

(54) TIRE AIR PRESSURE DEFLATION SYSTEM

(71) Applicant: AGRIBRINK HOLDINGS LTD., Moorefield, Ontario (CA)

(72) Inventors: Jake Kraayenbrink, Moorefield (CA); Steve Bailey, Palmerston (CA); Maurice Veldhuis, Moorefield (CA)

(73) Assignee: AGRIBRINK HOLDINGS LTD., Ontario (CA)

( * ) Notice: Subject to any disclaimer, the term of this patent is extended or adjusted under 35 U.S.C. 154(b) by 0 days.

(21) Appl. No.: 15/115,299

(22) PCT Filed: Jan. 28, 2015

(86) PCT No.: PCT/CA2015/050056
§ 371 (c)(1),
(2) Date: Jul. 29, 2016

(87) PCT Pub. No.: WO2015/113151
PCT Pub. Date: Aug. 6, 2015

(65) Prior Publication Data
US 2017/0001481 A1    Jan. 5, 2017

Related U.S. Application Data

(60) Provisional application No. 62/079,162, filed on Nov. 13, 2014, provisional application No. 61/934,038, filed on Jan. 31, 2014.

(51) Int. Cl.
*B60C 23/00* (2006.01)
*B60C 23/16* (2006.01)
*B60C 23/04* (2006.01)

(52) U.S. Cl.
CPC .......... *B60C 23/003* (2013.01); *B60C 23/002* (2013.01); *B60C 23/16* (2013.01);
(Continued)

(58) Field of Classification Search
CPC ..... B60C 23/00; B60C 23/001; B60C 23/002; B60C 23/003; B60C 23/10; B60C 23/16
See application file for complete search history.

(56) References Cited

U.S. PATENT DOCUMENTS 4,619,303 A * 10/1986 Bryan .................. B60C 23/001
137/224
4,640,331 A *  2/1987 Braun .................. B60C 23/003
137/224
(Continued)

FOREIGN PATENT DOCUMENTS

EP          0368365 A1 *  5/1990  ........... B60C 23/003

*Primary Examiner* — Kip T Kotter
(74) *Attorney, Agent, or Firm* — Lorelei G. Graham

(57) ABSTRACT

A tire air pressure deflation system comprising an air delivery system having gas communication with at least one vehicle tire, the air delivery system maintaining the desired tire pressure, and an adjustable air control system adapted to control the air pressure maintained in the air delivery system and supply or expel the air from the tire, the air control system having a starting pressure setting, and a finishing pressure setting lower than the starting pressure setting, the finishing pressure setting having an active pressure setting lower than the finishing pressure setting. Upon activation of the tire air pressure deflation system, the tire deflates to the active pressure setting and the air control system deactivates upon reaching the finishing pressure setting.

9 Claims, 13 Drawing Sheets

(52) U.S. Cl.
CPC .......... *B60C 23/00* (2013.01); *B60C 23/0408* (2013.01); *B60C 2200/08* (2013.01)

(56) References Cited

U.S. PATENT DOCUMENTS

| | | | | |
|---|---|---|---|---|
| 4,678,017 A | * | 7/1987 | Schultz | B60C 23/003 |
| | | | | 137/225 |
| 4,724,879 A | * | 2/1988 | Schultz | B60C 23/003 |
| | | | | 137/224 |
| 4,744,399 A | * | 5/1988 | Magnuson | B60C 23/003 |
| | | | | 137/102 |
| 4,754,792 A | * | 7/1988 | Braun | B60C 23/003 |
| | | | | 137/224 |
| 4,825,925 A | * | 5/1989 | Schultz | B60C 23/003 |
| | | | | 152/415 |
| 4,862,938 A | * | 9/1989 | Mittal | B60C 23/003 |
| | | | | 141/38 |
| 4,883,105 A | * | 11/1989 | Schultz | B60C 23/003 |
| | | | | 137/859 |
| 4,917,163 A | * | 4/1990 | Schultz | B60C 23/003 |
| | | | | 152/415 |
| 4,987,937 A | * | 1/1991 | Nowicke | B60C 23/00 |
| | | | | 137/550 |
| 5,141,589 A | * | 8/1992 | Mittal | B60C 23/003 |
| | | | | 137/224 |
| 5,249,609 A | | 10/1993 | Walker et al. | |
| 6,336,481 B1 | * | 1/2002 | Tigges | B60C 23/003 |
| | | | | 141/38 |
| 2012/0059546 A1 | | 3/2012 | Wilson et al. | |

* cited by examiner

Operating Display (1 Channel Enabled)

(2 Channels Enabled)

(3 Channels Enabled)

(4 Channels Enabled)

TIRE AIR PRESSURE DEFLATION SYSTEM

FIELD OF INVENTION

The invention relates to a system that can be used to expel air from a tire or tires of a vehicle. Further, the invention may relate to a system that supplies air to a tire or tires of a vehicle.

BACKGROUND OF INVENTION

Tractors, portable manure tanks, and other agricultural vehicles are ubiquitously used across crop production operations for seeding, fertilizing, and providing other inputs into farmland. While these agricultural vehicles are important for efficient distribution of inputs on fields, soil compaction from vehicle tires can negatively affect soil structure leading to decreased crop yields.

Equipment manufacturers have increased tire size and reduced inflation pressures on agricultural vehicles to lower ground contact pressures and reduce soil rutting and compaction. However, this tire adjustment to lower pressure has an adverse affect on vehicle performance and gas mileage when driven on roads and other non-farm field terrain.

Inflating and deflating tires to handle heavier loads is common practice in the trucking industry, but not something found in agriculture. Tire inflation systems have been attached to long haul trucking rigs as means of adjusting tire pressure while on the move. Systems that have been developed include the system described in U.S. Pat. No. 8,245,746 B2 disclosing a tire inflation system.

The tire inflation system of U.S. Pat. No. 8,245,746 B2 includes a hose connecting to a tire via a valve stem, a control valve in fluid communication with the hose that senses when pressure falls below predetermined minimum value. When this occurs, the control valve automatically opens to re-supply air to the tire until the predetermined minimum value is achieved. A pressure relieve valve is also in fluid communication with the hose. If, for example, ambient temperatures increase, causing tire pressure to increase, then the pressure relief valve automatically vents excessive pressure to the atmosphere. The pressure relief valve is set at a predetermined maximum pressure level that is generally at least 5 PSI more than the predetermined minimum value. While this system effectively senses change in tire pressure and reacts to adjust the tire pressure back to the desired pressure, it is configured to sense and react to small changes in tire pressure, not to efficiently adjust tire pressure between large pressure differences. Consequently, these systems would take a significant amount of time to deflate tires, as once the tire pressure approaches desired pressure, tire deflation slows considerably. Further, the cost of these systems are typically high.

There is a need for on-farm equipment that would control and adjust the tire pressure of field equipment whilst the equipment is in motion, and do so at a speed that allows the operator to efficiently move from road to field without having to wait significant time periods for tire pressure adjustment. The objective of adjusting tire pressure would be to deflate tires to below high pressures used on roads to reduce soil compaction, which would be damaging to field operations.

Best practices developing in the farm management have been driving the requirements to reduce costs of operation, increase efficiencies and conserve the land and water resources demanded in farm operation. Devices that relate to precision farming and more effective control of equipment and its effect in the operation are gaining acceptance as measures to mitigate the issues. It would be desirable to provide product that is a low cost, after-market accessory to assist in addressing the on land issue of soil compaction as well as the decreasing costs of fuel and efficiency.

SUMMARY OF INVENTION

The invention provides for a tire air pressure deflation system comprising an air delivery system having gas communication with at least one vehicle tire, the air delivery system maintaining the desired tire pressure, and an adjustable air control system adapted to control the air pressure maintained in the air delivery system and supply or expel the air from the tire, the air control system having a starting pressure setting, and a finishing pressure setting lower than the starting pressure setting, the finishing pressure setting having an active pressure setting lower than the finishing pressure setting. Upon activation of the tire air pressure deflation system, the tire deflates to the active pressure setting and the air control system deactivates upon reaching the finishing pressure setting.

In an aspect of the invention, the air control system controls the air pressure maintained in the air delivery system by setting the pressure of a relay valve.

In an aspect of the invention, the tire air pressure deflation system further comprises an air supply system in gas communication with the air delivery system supplying air to the air delivery system in order to inflate the tire.

In an aspect of the invention, a valve is located between the air delivery system and the tire to decrease the distance the air must travel to exhaust from the tire and tire air pressure deflation system.

In an aspect of the invention, an air supply system is in gas communication with the air control system to feed a reference tank within the air control system, the reference tank being in gas communication with a pilot valve which normalizes the pressure between the air delivery system and the tire or tires of a vehicle.

In another aspect of the invention, the control system further comprises a switch that is located in close proximity to the operator of the vehicle, the switch controlling the activation and deactivation of the tire air pressure deflation system.

In an aspect of the invention, the finishing pressure provides reduced field compaction from tires relative to the starting pressure.

In an aspect of the invention, a sensor is in communication with the tire pressure to dictate when the air control system switches from active pressure to finishing pressure.

In an aspect of the invention, the deflation time is programmed into the air control system allowing the system to determine when to switch from active pressure to finishing pressure based on the time required to deflate the tire from starting to finishing pressure.

In an aspect of the invention, the active pressure is below the finishing pressure by at least 5 PSI.

BRIEF DESCRIPTION OF DRAWINGS

Having thus generally described the nature of the invention, reference will now be made to the accompanying drawings, showing by way of illustration, a preferred embodiment thereof, and in which.

DETAILED DESCRIPTION

Figure 1:
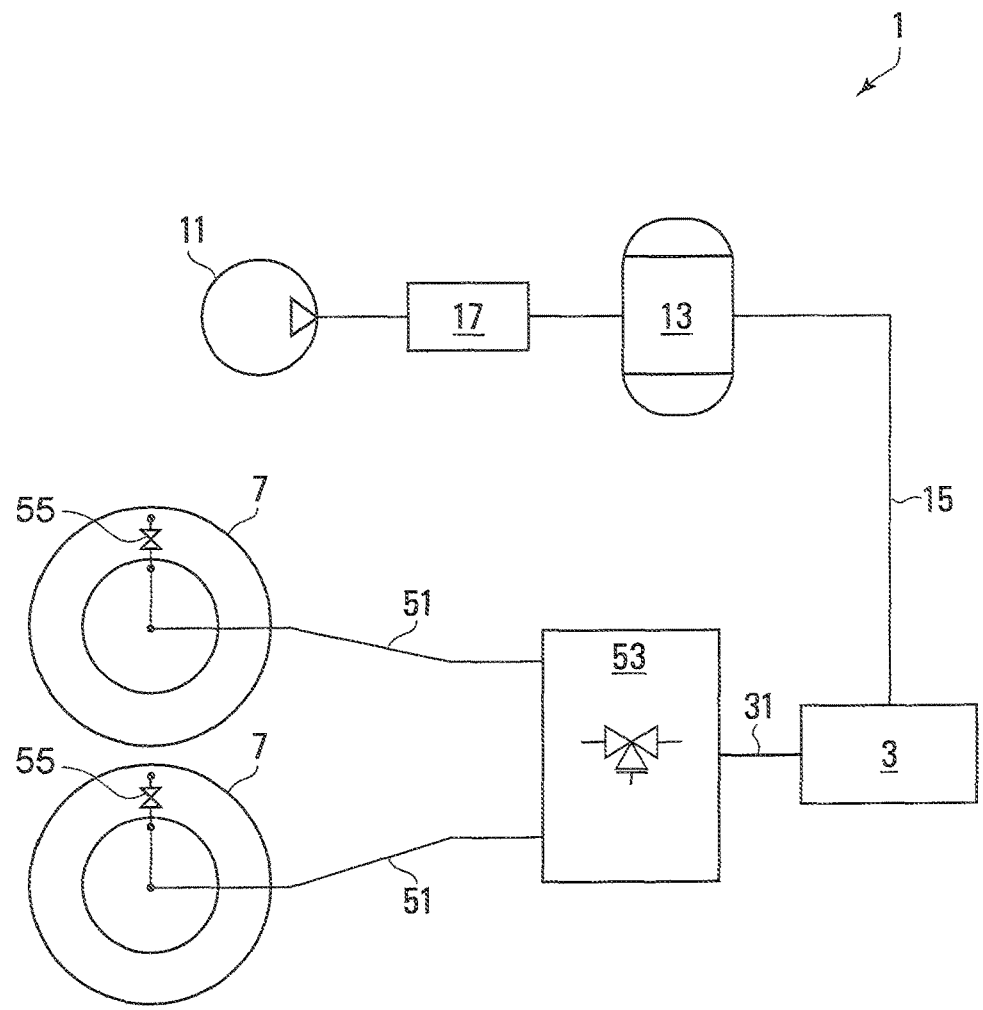
FIG. 1 is a schematic diagram of an embodiment of the tire air pressure deflation system.

The invention provides for a system that increases the speed of deflation of tires on a vehicle. This provides an advantage to a vehicle moving between different types of terrain, for example, moving from harder to softer terrain. The vehicle may be an agricultural vehicle moving from road to field terrain, allowing for efficient deflation of tires to reduce field compaction and increase traction.

Referring to FIGS. 1 to 5, there is provided an air pressure deflation system comprising an air delivery system (5) having gas communication with at least one vehicle tire (7), the air delivery system (5) maintaining the desired tire pressure, and an adjustable air control system (3) adapted to control the air pressure maintained in the air delivery system (5) and supply or expel the air from the tire (7), the air control system (3) having a starting pressure setting, and a finishing pressure setting lower than the starting pressure setting, the finishing pressure setting having an active pressure setting lower than the finishing pressure setting.

The system can be installed on most vehicles including mobile farm equipment. Specifically the system can be configured to control multiple channels that can adjust tire pressure. Typically there can be between one and four channels. In this configuration, one channel may be used to control the pressure of front tires of a vehicle, the second channel may be used for the tractor's rear tires, and a third channel might be used for the tires on a fertilizer spreader trailer.

The air delivery system may comprise a valve (53) controlling release of air from the system. The valve (53) may be a relay valve, 2-port valve, or any other valve capable of closing, opening for maximum flow, or being partially open allowing partial flow through the valve. Alternatively, the system can comprise multiple valves. The valve pressure setting is operated by the adjustable air control system and maintains the desired pressure setting within the air delivery system (5).

As an example, if the air control system (3) causes the valve (53) to change from allowing 60 PSI to be maintained in the air delivery system (5) to an active pressure of 20 PSI, the air delivery system (5) pressure will drop towards 20 PSI. Once the desired finishing pressure is achieved, the pressure setting moves or switches to the finishing pressure (eg. 30 PSI) and maintains 30 PSI within the tire (7) or tires.

In an embodiment of the invention, tire air pressure deflation system may further comprise air supply system (1). The air supply system (1) may be in gas communication with the air delivery system (5). The air supply system (1) may supply air to the air delivery system (5) in order to inflate the tire (7) or tires. The air supply system may comprises a source of compressed air and an air supply tube supplying compressed air to the valve (53) to the delivery system at a pressure controlled by the air control system (3).

The air supply system (1) may comprise any means of providing pressurized air to the air delivery system (5). Preferably, the air supply unit comprises storage of compressed air and distribution of compressed air from the storage unit. The air supply unit may be comprised of an air compressor (11) and a compressed air storage tank (13) whereby the air compressor feeds air to the compressed air storage tank. Typical pressure in the storage tank (13) is from 120-150 PSI although any air pressure above the highest desired tire pressure may be used.

Air compressors (11) are well known in the art and there are many different sizes and models that can be used to fill the compressed air storage tank (13) or tanks. Air compressors (11) are well known in the art and there are many different sizes and models that can be used to fill the compressed air storage tank (13) or tanks. The air compressor (11) preferably is stably mounted on the vehicle in a location that will minimize wear. The compressor may have a hydraulic or mechanical drive.

The total storage volume and pressure of the compressed air storage tank (13) or tanks could vary to optimize performance based on total volume of tires (7). Optimally, at least 70-80% of the air needed for tire inflation should be held in the compressed air storage tank (7) or tanks.

Air supply systems comprised of air compressors and storage tanks are well known in the art. Any air compressor or compressed air storage tank could be used provided it provides communication with the air delivery system allowing air to travel from the compressor (11) and/or storage tank (13) to the air delivery system through gas communication means such as air tubes.

The air supply system can optionally comprise an air filtration and moisture control unit (17) for maintenance of air quality. Air filtration and moisture control could be disposed in locations throughout the tire air deflation system, but is preferably an upstream component.

The air delivery system (5) may provide gas communication between the air supply unit (1) and tires (7) of the vehicle. The air delivery system or unit is comprised of an air tube (51), its outer walls not permeable to air, linking the air supply (1) and at least one tire (7). Air flow between the air supply (1) and at least one tire (7) may be controlled by a relay valve (53) placed at a point along the tubing between the air control unit (3) and tire (7).

The relay valve may comprise a double-ported diaphragm to maintain desired pressure in the relay tube within the air delivery system. The relay valve may be connected to a reference pressure tube communicating with the air control system (3).

The relay valve (53) may also be in gas communication with the air supply unit (1). The adjustable air control system (3) dictates the pressure the relay valve (53) will maintain within the air delivery system (3). The pressure the relay valve (53) maintains within the air delivery system (5) may be controlled by a reference pressure tube (31) which dictates the air pressure released from the air supply unit (1) through the air delivery unit to the tire to increase tire pressure or released from the tire through the air delivery system (5) to lower tire pressure. The air delivery unit may also comprise a quick release valve (55) capable of releasing air to the desired air pressure. The quick release valve (55) is preferably located close to the point that the air tube is connected to the tire. The quick release valve acts as a relay valve between the tire and an air supply line (51) from the first relay valve (53).

The connection between the air delivery system (5) and tire (7) may comprise a ball joint and stem valve. Preferably, the stem valve has a diameter across large enough to evacuate air at a rate sufficient to deflate the tire at the desired speed. A swivel hub may connect the air delivery system (5) to the wheel.

Air supply lines (51) may be used to provide gas communication from the compressed air storage tank to the relay valve and from the relay valve (53) to the quick release valve (55) or valves to the tire or tires. The air supply line (51) may further include air tubes, relay tubes or hoses. The tubes are preferably DOT (Department of Transportation) certified synflex hose. The lines are preferably connected to valves using compression fitting or other fittings that will not allow air to escape from the system except through valves intended for releasing air.

The quick release valve (55) can he located directly adjacent to the tires, acting as the valve stem for the tires. In this case, the quick release valve (55) protrudes through the rim to the tire. This provides quicker deflation of tires, as the air only travels a short distance from the air chamber in each tire (7) prior to evacuation. Preferably, the air travels directly out of the tire to the exhaust port of the quick release valve (55) as bends or turns in the route to the exhaust port would slow the release of air while deflating tires (7). Alternatively, the quick release valve (55) can be located away from the tires. This may be done if time for air evacuation can be extended such as on field sprayers where the sprayer must be stopped and spraying components must be prepared prior to driving the sprayer onto a field. The reason for moving release valves away from the tires is that if deflation speed is not paramount, more cost effective release valves that would not act as a valve stem for the tire (7) can be used.

The quick release valve(s) (55) preferably have a manual shutoff. The quick release valve(s) is preferably a Humphrey quick release valve model #RA505 or a Parker quick release valve model #OR75B. The valve can be any width that is capable of transferring air and equalizing pressure between air storage on either side of the valve. For example, the quick release valve may be ¾" and capable of exhausting about 3000 ft$^3$/minute or ½" and capable of exhausting about 1750 ft$^3$/minute.

More specifically, the hose or air tube between the air storage tank (13) of the air supply system (1) and the air delivery system (5) or the relay valve (53) component of the air delivery system (5) can be called the air supply tube (15), and the hose or air tube between the relay valve and the tire can be called the relay tube (51).

There may be one relay tube running from the relay valve (53). The relay tube (51) may then split into as many tubes as required to feed each tire (7) in the system. Alternatively, a number of air supply lines or relay tubes (51) may run from the relay valve (53) to different tires (7) or split into numerous tubes to run to supply air to different tires. The limiting factor is that each relay valve (53) may be set to only one reference air pressure at any one time. As such, if different tire pressures are required, for example, for front and rear tires, different relay valves are required for each pressure setting.

The air hoses and valves of the tire air pressure deflation system preferably run in as straight a line as possible from the air supply unit to the tires so as to minimize hindrance of air flow from air source to tires thus maximizing speed of inflation or deflation. It is understood that different configurations could be used. As such, the system may comprise angles and bends where required to efficiently configure the system on a vehicle.

The tires often have a stem valve, to which the air supply line or relay hoses (51) or quick release valves (55) can be connected. Different means can be utilized to provide gas communication from the tire through the valve stem to the quick release valve.

If the system does not comprise a quick release valve (55) between a tire (7) and the relay valve (53), air is exhausted through the exhaust port of the relay valve.

The relay valve or valves and quick release valve or valves typically comprise a double-ported diaphragm.

The air supply or relay tube (51) may be mounted on a swivel protruding from the vehicle and directing the relay tube (51) to the tire (7). The system may be mounted on the vehicle by any means of attaching hoses and valves to vehicles and mobile farm equipment. This may include clamps, hangers, adhesives, or other means.

The air control system (3) comprises a system for controlling the air pressure maintained within the air delivery system (5) and thus the tire (7) or tires the air delivery system supplies. The air control system (3) has at least 3 reference pressure settings, a starting pressure, a finishing pressure below starting pressure, and an active pressure, below finishing pressure.

Preferably, the starting pressure Is the optimal tire pressure for driving on road surfaces, for example 40 PSI, dictated by vehicle performance and gas efficiency. Preferably, the finishing pressure is the optimal tire pressure for driving on agricultural fields so as to decrease soil compaction relative to road pressure, in this case, the active pressure is an air pressure below field pressure.

Figure 6A:
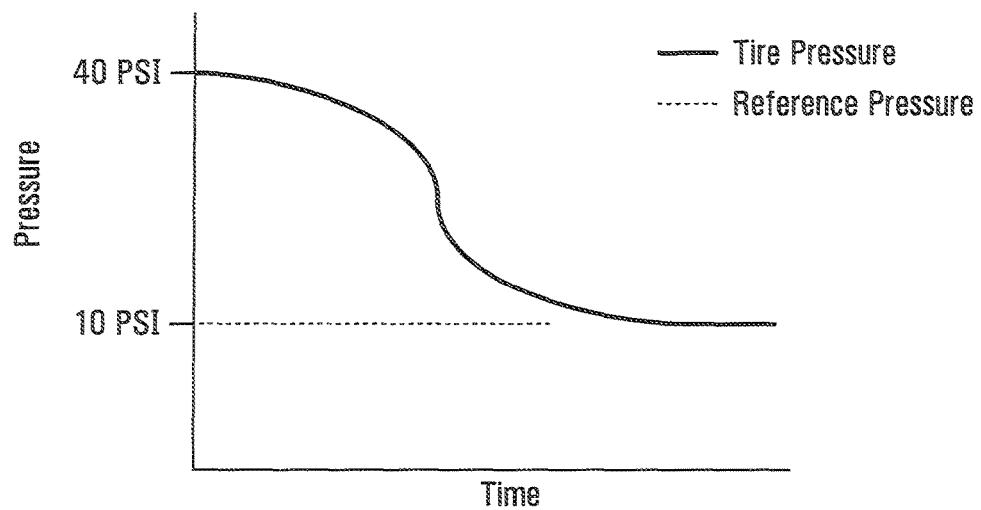
FIG. 6a is a graph demonstrating the Prior Art.
Figure 6B:
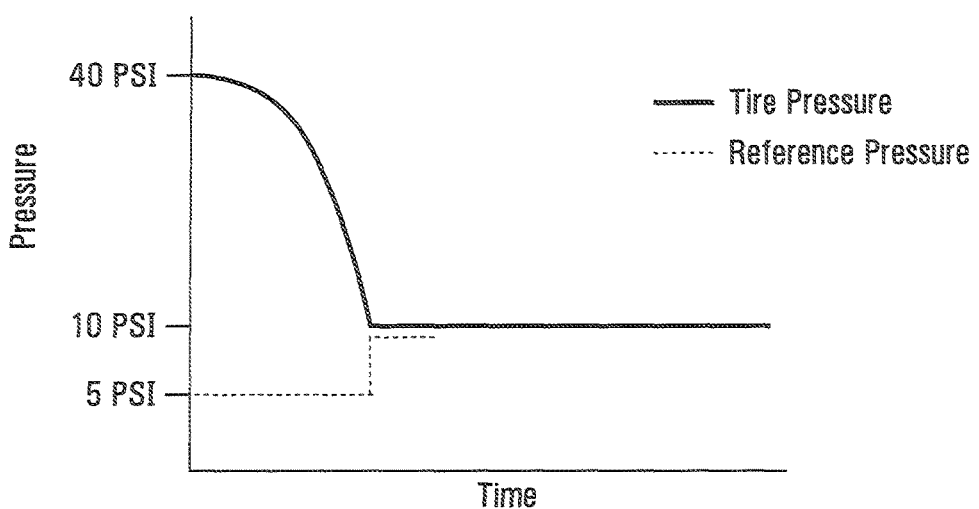
FIG. 6b is a graph demonstrating the increase in tire air pressure deflation speed when an embodiment of the invention is in use.
Figure 7:
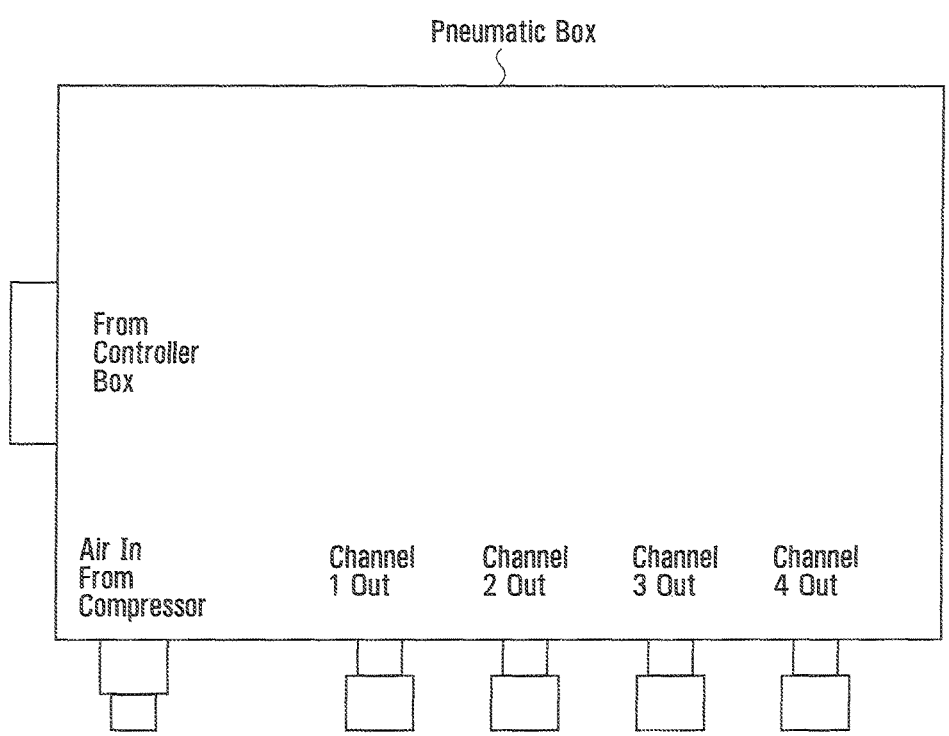
FIG. 7 is a schematic diagram of an embodiment of the electronic control box.
Figure 8:
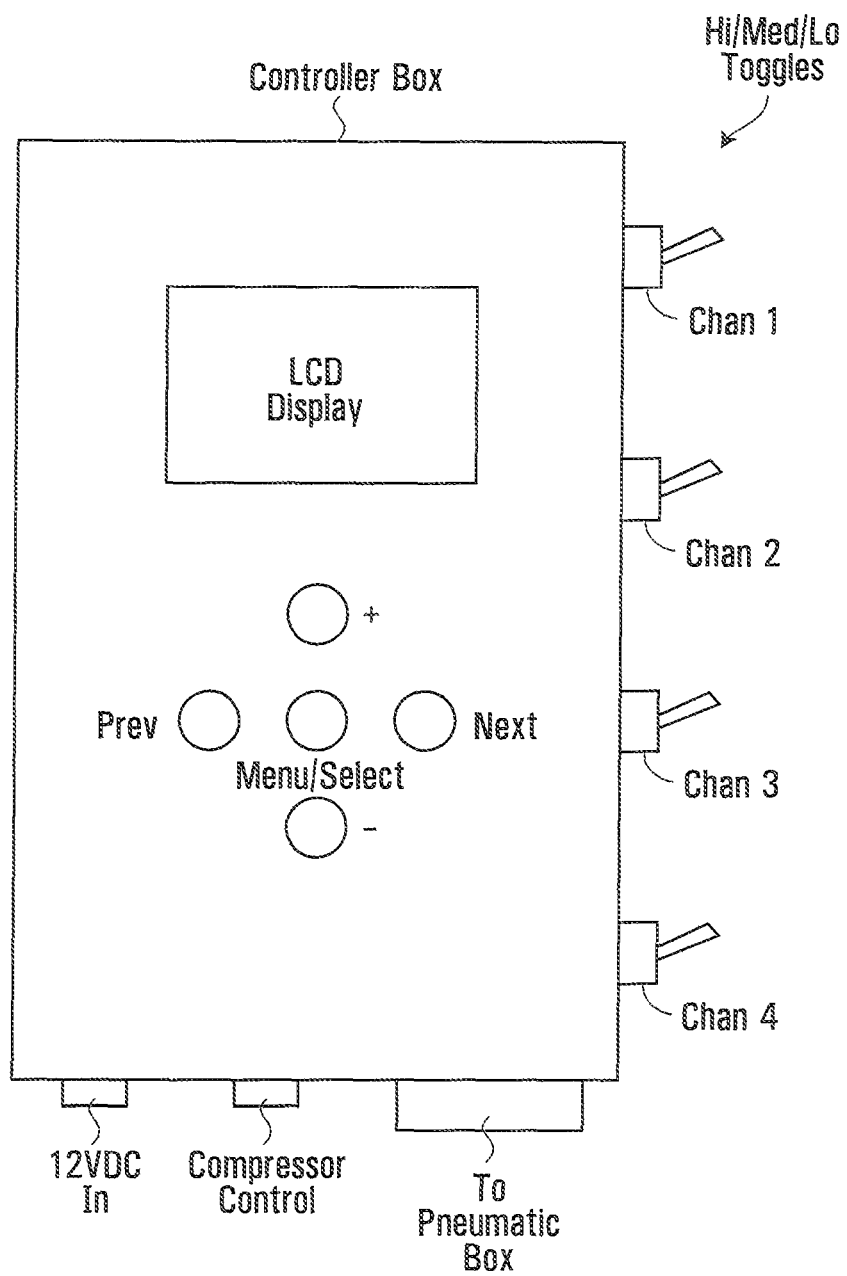
FIG. 8 is a schematic diagram of an embodiment of the pneumatic box.
Figure 9A:
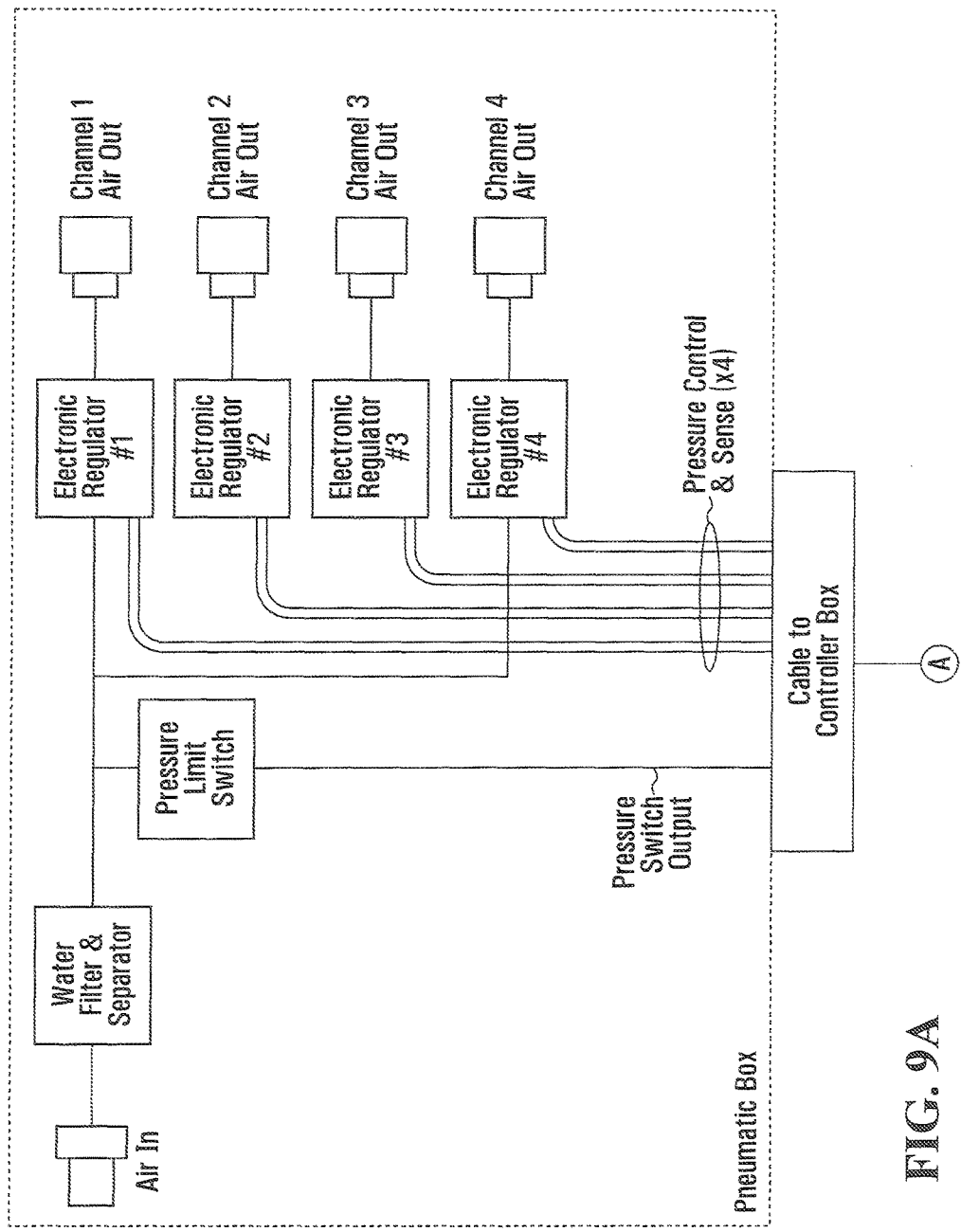
FIG. 9 is a schematic diagram of an embodiment of the electronic control box and pneumatic box.
Figure 9B:
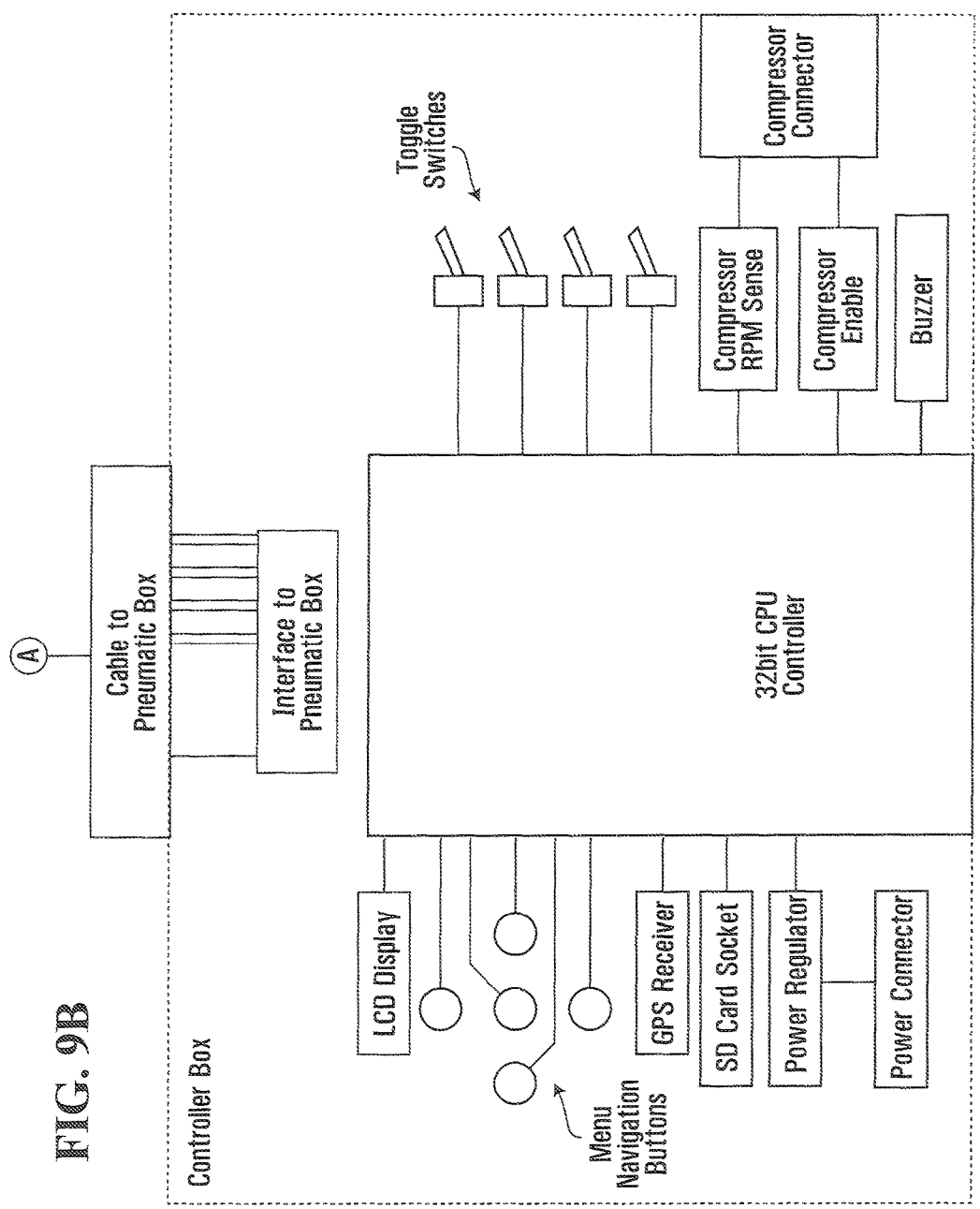
Figure 10:
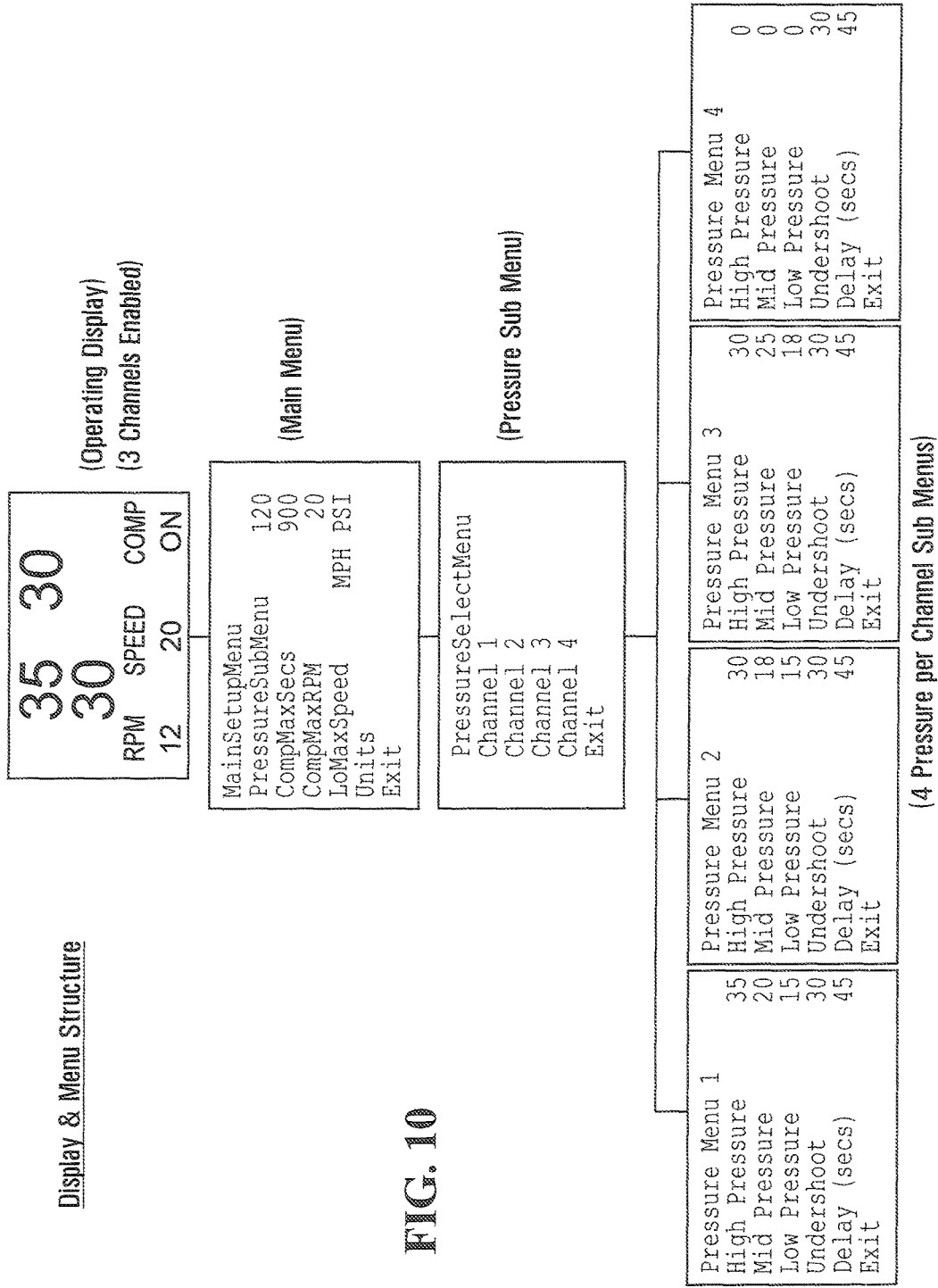
FIG. 10 is a schematic diagram of an embodiment of the display and menu structure.
Figure 11:
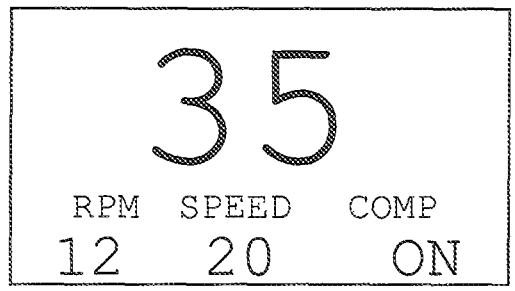
FIG. 11 is a schematic diagram of an embodiment of the operating display.
Figure 11:
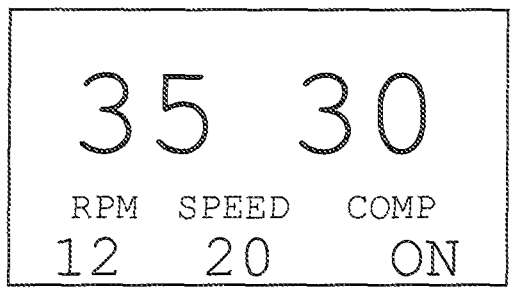
Figure 11:
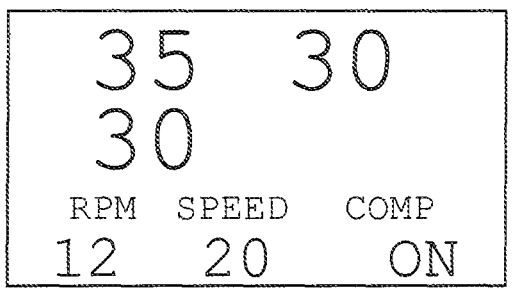
Figure 11:
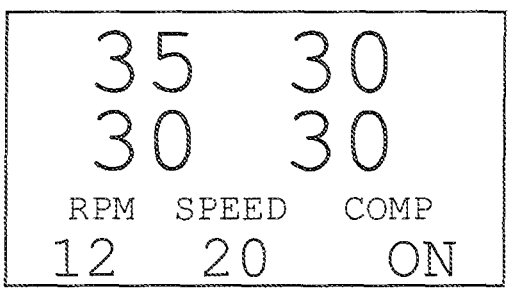
Figure 12:
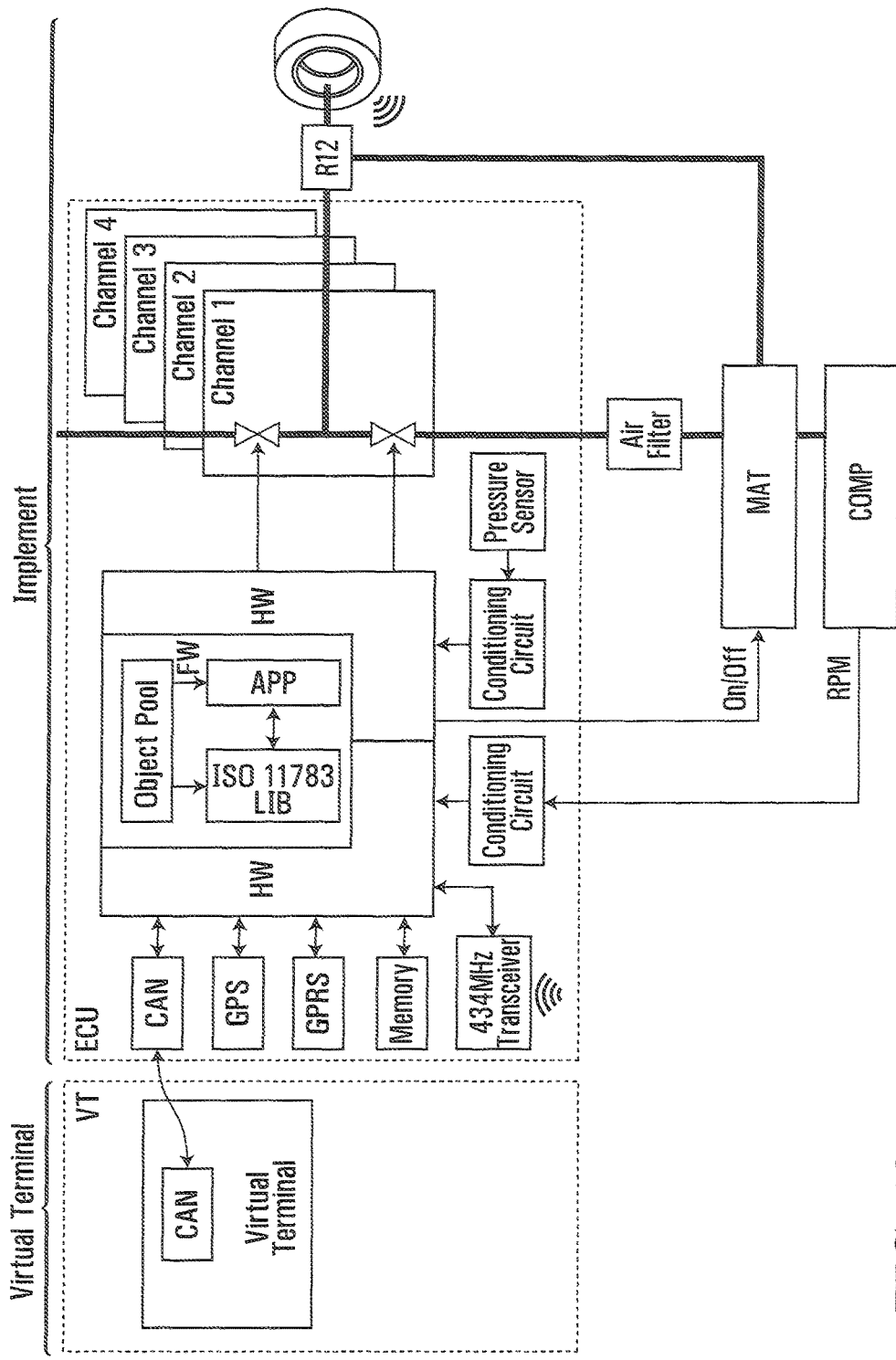
FIG. 12 is a schematic diagram of the embodiment of the wireless sensor tire pressure system.

Reference pressure settings are set at the desired pressure to inflate or deflate tires to through air delivery system. An example of a typical deflation curve is provided in Graph A of FIG. 6. In this curve, the tire pressure drops significantly before tire deflation speed slows as the tire pressure gets closer to the desired field pressure.

The system has been manipulated to set the reference tube pressure below the desired field pressure when deflating tires. When the tire pressure reaches field pressure the reference pressure is raised to and maintained at the desired field pressure (Graph B of FIG. 6). Since the deflation occurs with the expectation of the pressure dropping to below the desired field pressure, pressure drop does not slowly level off near the end of the deflation process. Rather, pressure drops steeply until it reaches the desired field pressure at which point the reference pressure has been raised from below field pressure to field pressure. This provides for an advantage over typical deflation systems used in vehicle tires, since the tires can be deflated from high pressure to the desired low pressure in significantly less time.

The adjustable air control system (3) may comprise of an air control unit for controlling the air pressure provided from the air supply unit (1) to the tire (7) through the relay valve (53) to the air delivery system (5) to inflate the tire (7). The air control unit can be comprised of mechanical air pressure regulation, such as a series of electromagnetic switching valves, or electronic air pressure regulation. The air control system can set a desired pressure in a reference pressure tube that is in communication with the relay valve (53) of the air delivery system, to dictate the pressure at which the valve (53) will maintain the air delivery system (5), and thus the vehicle tire (7) or tires. The relay valve (53) may therefore match the tire pressure to the pressure set in the reference pressure tube. The actual value of the tire pressure may therefore not be known or measured directly.

In another embodiment of the invention and referring to FIGS. 7 to 12 there is provided the air unit is comprised of electronic control means, namely an electronic control box having at, least 3 final air pressure settings, 1 or more small reference pressure tanks (33) having gas connection between the air supply system and each tank having a switching valve (39), such as a 5 way 3 position close type switching valve, to control movement of gas in and out of the reference pressure tank (33) to reach of at least 3 air pressure settings. The reference pressure tank (33) is further in air communication through a pilot valve and tube, shown together in FIG. 3 as the reference pressure connection (43), with the air delivery unit. The function of the pilot valve is to normalize pressure of the air delivery system to the reference tank pressure. The air delivery system then delivers the normalized pressure to a tire or tires on a vehicle.

More specifically the electronic control box may include a plastic, weatherproof enclosure to enclose and house the electronics such as the control board. The control board may contain a CPU, LCD display, memory for saving settings, a power supply, GPS with internal antenna and an SD memory card socket for logging speed data. For example nine switches may be provided on the controller some of which may be weatherproof pushbuttons on the front that can used to configure the unit. For example they may include a previous/next pair, an up/down pair and a select or enter button. Once configured, these buttons should not be needed during normal operation.

The electronic control box may also include multiple 3-way toggle switches on the enclosure. Each switch may represent a selection of the current pressure for each control channels. For example in the elevated position, the maximum pressures would be selected, the middle position would represent the middle pressure and when depressed, the lower tire pressure setting is selected.

Based upon the levels that have been configured, the electronic control box signals the pneumatic box to dynamically change the levels on the electronically adjustable pressure regulator (one per channel).

The pneumatic box consists of a male ¼" NPT air inlet from the compressor, a filter/separator assembly as well as a pressure detector switch that is used to determine if the air compressor should engage. This switch contains hysteresis and which will disable the compressor once the pressure reaches 135 PSI and then engage the compressor once the pressure drops to 90 PSI.

Control of the compressor is achieved via a 12V, 2 amp output contact pair. This output can drive an interposing high power relay if needed. Subsequent to the pressure switch, the air is routed to up to 4 electronically controlled pressure regulators. Each regulator is routed to a: female ¼" NPT air connector on the lower edge of the enclosure. Each of these control air channels is used to control the valve assembly mounted on the vehicle tires.

In one embodiment of the invention, wireless sensors may be adapted to engage the tires. The wireless sensors are enabled to read the tire pressure directly and communicate these readings to the control box. Direct readings of the tire pressure allow for the relay valve (53) to adjust the tire pressure as needed therefore resulting in better and more precise control. The wireless sensors may also provide readings with respect to the sensors' own battery level and temperature allowing for monitoring and easy maintenance.

In an embodiment of the electronic control box, the air supply may provide air into the electronic control box, where the air passes through an air filter, regulator, and lubricator. The air may then pass to an automatic control valve which, through communication with the control switch (60), sets the air pressure flowing to and maintained in the reference pressure tank (33). The air may then pass through a flow rate control (32) to the reference pressure tank (33). The air pressure in the reference pressure tank (33) then dictates the pressure maintained, allowed into, or allowed out of the air delivery system (5) by the relay valve (53) as air passes from the reference pressure tank (33) through a pilot valve and to the relay valve (53) through a hose or tube.

The hose between the air control system (3) and the relay valve (53) can be called the pressure differential tube (31). The pressure of the pressure differential tube (31) sets the pressure the relay valve (53) maintains within the air delivery system (5). The pressure setting in the pressure differential tube is provided through communication with the air control system (3). In an embodiment of the invention, the, relay valve (53) equalizes the pressure between the pressure differential tube (31) and the relay tube (51), while the quick release valve equalizes the pressure between the tire (7) and the air supply line or relay tube (51).

The air supply unit (1) may also provide air to the air control unit (3). If the air control system (3) comprises a reference pressure tank (33), air can be fed from the air supply system (1) to the reference pressure tank to a desirable tire pressure setting.

The air supply into the electronic control box may pass through an air filter (36) before passing through to the switching valve (39). Further, the air control system (3) may have a manual override (37) the operator can activate to set the reference pressure manually, if desired.

The electronic control means can govern by a switch with at least 2 settings. The switch can be connected to a communication board (35), which communicates pressure settings to the switching valve. The switch may have an active and an inactive setting. The switch may have an inflate, a deflate, and an off or inactive setting. In an embodiment of the Invention the electronic control box may also be configured not only for at least 3 final air pressure settings but may also be configured for the parameters for the 3 final air pressure settings for each channel via a dynamic LCD Display. The parameters for each channel may be easily changed via three way toggle switches.

The electronic control box may further include a pneumatic box connected via a multi-conductor cable. The pneumatic box may provide individual pressure-regulation for up to 4 channels of control. It also provides a connector for monitoring and control of the air compressor (RPM in and a solid state output relay for enabling the compressor). An air compressor is required to supply the pneumatic box as well as a source of high pressure air for inflating the tires.

Each tire requiring controllable pressure may be equipped with a valve assembly (10) controlled by the output of a channel from a pneumatic box. More than one tire can be controlled by a single control channel (e.g. the rear tires of a tractor) but each tire needs a controllable valve assembly.

The controllable valve assembly engages when the air pressure in the single control channel is higher than the pressure in tires. The controllable valve assembly will pass air from the compressor line into the tires, causing them to inflate. If the pressure of the single control channel is lower than that of the are, the valve will vent air to the surroundings.

The communication board (35) is preset to control air input and release to and from the reference pressure tank (33) to bring the air pressure in the reference pressure tank (33) to predetermined values.

The communication board may comprise a display and 6 buttons that allow the operator to modify a number of parameters prior to use In the field. There is a set of parameters for each small reference tank to allow between 1 and 4 pressure output channels that provide a reference pressure to the pilot valves. At a minimum, a low, medium, and high-pressure target parameter can be set for each of the output channels. The communication hoard receives a pressure sensor reading from each of the small reference tanks and uses this reading to add air to increase the pressure or release air in order to decrease the pressure in the reference tank as needed to meet the desired target pressure.

The communication board may read between 1 and 4 operator switches in order to select the target pressure for each of the output pressure references. Another pressure sensor may read the incoming pressure from the main air supply tank and enabling the communication board to provide an on and off signal to activate the compressor if the overall input pressure has dropped below the minimum target parameter and it will turn off the compressor if the maximum target parameter value is reached.

The tire air pressure deflation system is configured through a menu based series of screens that are shown on the LCD display. Normally, the display shows the pressure on each active channel as well as the compressor RPM, vehicle speed and compressor status.

For example the main menu may be engaged by pressing the center (or menu) button enters setup mode. The main menu will look similar to the following display by way of example only:

| MainSetupMenu |  |
|---|---|
| PressureSubMenu |  |
| CompMaxSecs | 120 |
| CompMaxRPM | 900 |
| LoMaxSpeed | 20 |
| Units | MPH PSI |
| Exit |  |

The items that have values to the right can be configured in this menu. Those that do not can be selected as they lead to sub menus.

Using the prev/next buttons causes the cursor to step backwards or forwards through the menu items. If the cursor is on a menu item that can be changed, using the –/+ buttons will change the value of the parameter. On the main menu screen, there are 4 parameters that can he changed.

CompMaxSecs determines the maximum amount of time that the compressor can run in a single operation. If the compressor exceeds this value, an audible alarm will occur (See alarms below). CompMaxRPM deteremines the maximum safe operating speed for the compressor, if the compressor exceeds this RPM rating, an alarm will occur.

LoMaxSpeed deteremiens the maximum vehicle sopeed that is safe when the pressure of any of the active channels is set to either low or medium pressure. If this speed (as determined by the GPD) is exceeded, an alarm will occur.

Units determine the speed and pressure types for control and monitoring. The options are:

| MPH PSI |
|---|
| KPH PSI |
| MPH BAR |
| KPH BAR |

The set of units can be selected as with any other parameter, namely by cycling through the choices using the –/+ buttons. A menu may be exited by pressing selecting exit and then pressing either the – or + button. This applies to main and sub menus. In this case, the only sub menu is the Pressure Sub Menu. One again, if this item is selected, pressing – or + will enter the submenu.

| Pressure Sub Menu |
|---|
| PressureSelectMenu |
| Channel 1 |
| Channel 2 |
| Channel 3 |
| Channel 4 |
| Exit |

This menu has no directly modifiable parameters. It is used to access a further sub menu for each channel. For example, if channel 1 is selected and then activated by – or +, the first sub menu will he displayed similar to the following:

| Channel N Sub Menu | |
|---|---|
| Pressure Menu | 1 |
| High Pressure | 35 |
| Mid Pressure | 20 |
| Low Pressure | 15 |
| Undershoot | 30 |
| Delay {secs} | 45 |
| Exit | |

This menu has the following meaning:

When set to high pressure using the toggle switch, the control channel regulator for channel 1 will provide 35 (in this case PSI) air. When set to mid pressure using the toggle switch, the control channel regulator for channel 1 will provide 20 (in this case PSI) air. When set to low pressure using the toggle switch, the control channel regulator for channel 1 will provide 15 (in this case PSI) air. As the system will deflate faster if there is some undershoot (i.e. lowered beyond the target pressure), 2 parameters are configurable to assist in the process. The undershot is the percentage below the target. The delay is the time in seconds to maintain this undershot.

For example:

From the above values, the mid pressure is set to 20 PSI with an undershot of 30% for 45 seconds. 30% of 20 PSI is 6 PSI.

Thus when deflating from 35 PSI to 20 PSI, the control pressure is set to 14 PSI (20 PSI–6 PSI undershoot) to accelerate deflation. This lowered pressure is maintained for 45 seconds. After the 45 second period, the pressure is then bumped back up to 20 PSI.

Similarly; when deflating to the low pressure level, the target would be 15 PSI (–30%) or about 10.5 PSI for the same delay period. As with ail menus, the menu can be exited by selecting the Exit line and then pressing – or +.

During normal operation, if an alarm condition occurs, the alarm can be reset by pressing the select button.

Timer parameters can be adjusted by the operator to enable a high rate of deflation by setting a reference pressure that is several PSI below the actual target pressure for a set of tires. This lower reference pressure, active pressure, ensures that the pilot valve and quick release valve drop the air pressure as quickly as possible. The timer must be set to bring the reference pressure back up to the desired target just in time to prevent the tire pressure from going too low. When possible, up to 4 additional pressure sensors can be installed on the communication board that would allow input of pressure readings from the output of the quick release valve or valves. Where this is possible, the communication board can use the readings on the output side of the quick release valve to automatically control the length of time that the reference pressure stays at active pressure below the finishing pressure for fast deflation. In such a system, the operator would not need to pre-program timer values as the control would be able to use sensor inputs to automatically determine the necessary tuner values.

When not possible as a permanent installation, an auxiliary pressure input can also be provided that would allow for calibration of the timer values using a manual process whereby an tire air pressure deflation system has an air pressure hose temporarily installed between the valve stem on one of the tires and the auxiliary pressure input on the control unit. A calibration process can be used that would allow the control to determine the necessary timer values.

The calibration process would need to be repeated for each of the output reference air pressure channels. The communication board will also monitor the input source tank pressure and can produce an alarm condition in the event a drop in air pressure is detected when it is not expected. This can indicate a leak in the air system and will warn the operator, allowing for corrective action to be taken before the tires all go flat.

Another function of the communication board may be to take readings from an infernal GPS module with the sole purpose of obtaining a rate of speed reading. This information will be stored in an internal memory along with date, time and tire target pressures. This data can be downloaded at a later date to be correlated with tire wear issues in order to ensure the air pressure was controlled to meet the pressure/speed provided by the tire manufacturer. The electronic control box may also includes a GPS receiver to measure the speed of the vehicle and may contain a removable SD memory card that logs the speed of the vehicle and tire pressures as a function of time for warranty purposes. An audible alarm is provided that is activated if the system is operating outside of the defined limits (e.g. driving above a speed threshold with deflated tries).

The communication board, controlled by the electronic switch, can set the reference pressure tube to a starting pressure, a finishing pressure, and an active pressure. The starting pressure may he the optimal tire pressure for driving on road surfaces, for example 40 PSI, dictated by vehicle performance and gas efficiency. The finishing pressure may be the optimal tire pressure for driving on agricultural fields so as to decrease soil compaction, relative to road pressure. The active pressure is an air pressure below the finishing pressure, which would lead to quicker deflation of tires through the system.

The active pressure may be one set pressure, or may be multiple active pressures all below the finishing pressure.

The starting pressure may be any pressure determined to be optimal. The finishing pressure may be any pressure determined to be optimal provided it is below the starting pressure. The active pressure may be any pressure or multiple pressures provided it is below the finishing pressure.

The control switch, which allows the operator to dictate inflation and deflation settings of the system can be any switch or button with at least 2 settings. The control switch is preferably a toggle switch. This provides for ease of operation in the cold, when an operator may be wearing gloves. Further, the operator can more easily decipher from sight whether the system is set to inflate or deflate (eg. road or field pressure).

The electronic control box or just the electronic control switch can be located in the cab of the vehicle for easy access to the operator.

Figure 2:
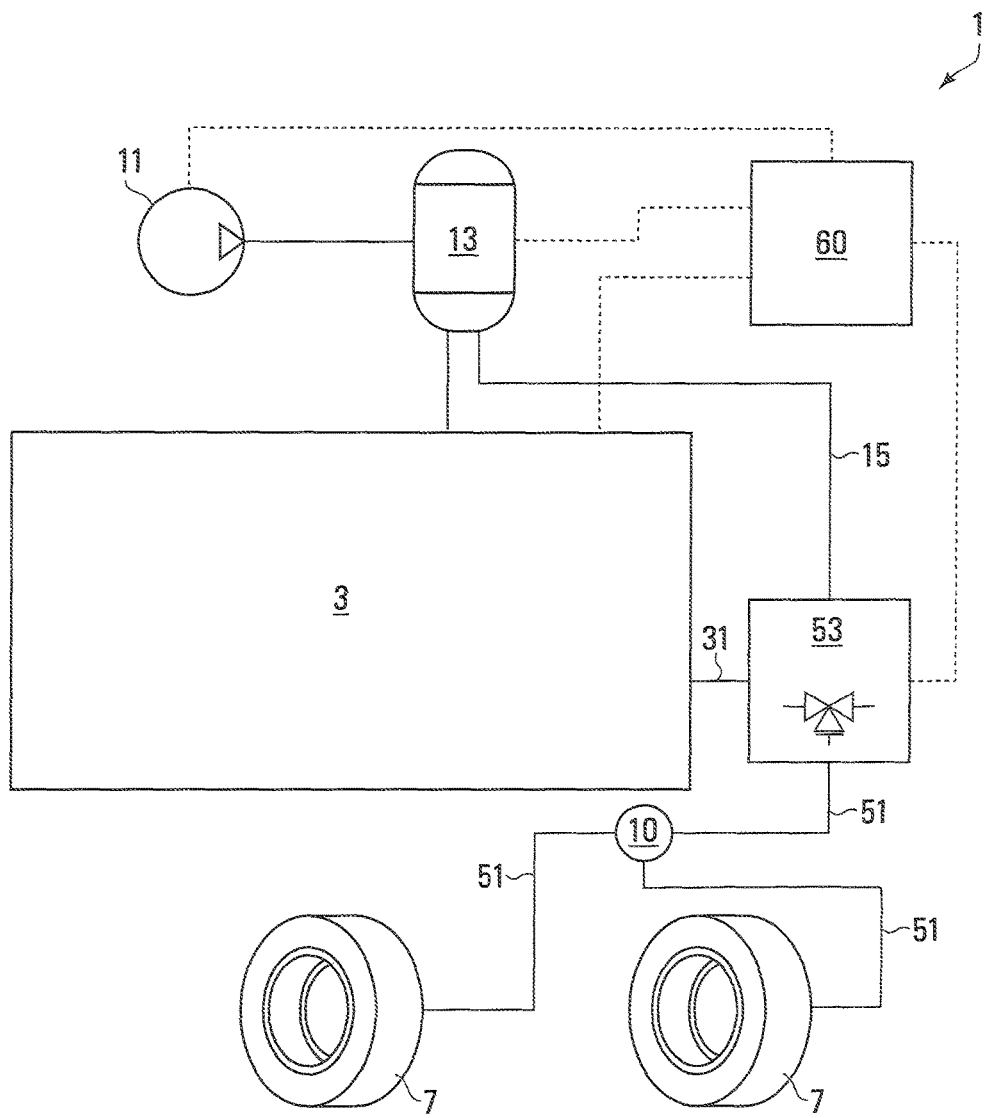
FIG. 2 is a schematic diagram of an embodiment of the tire air pressure deflation system.
Figure 3:
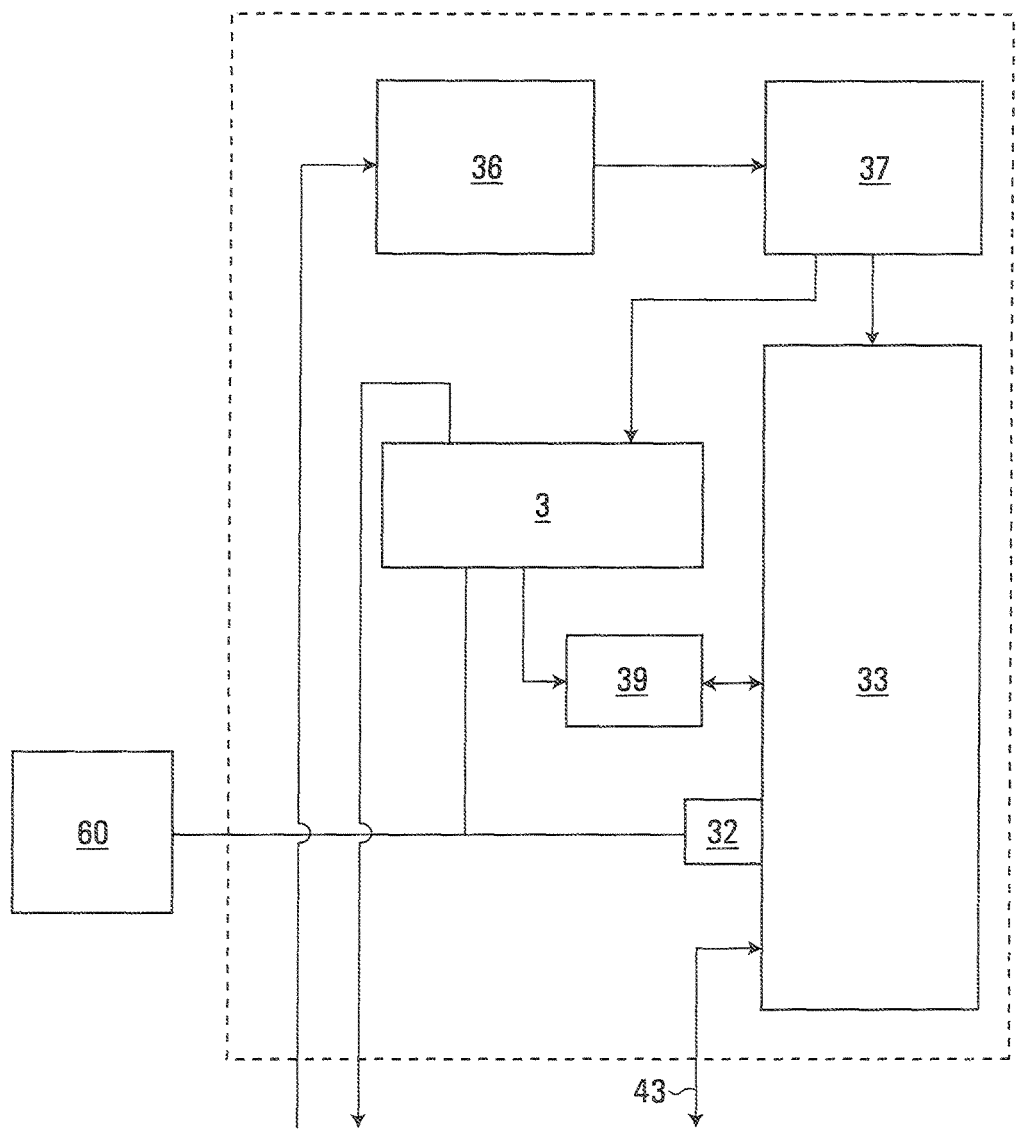
FIG. 3 is a schematic diagram of an embodiment of the air control system.
Figure 4:
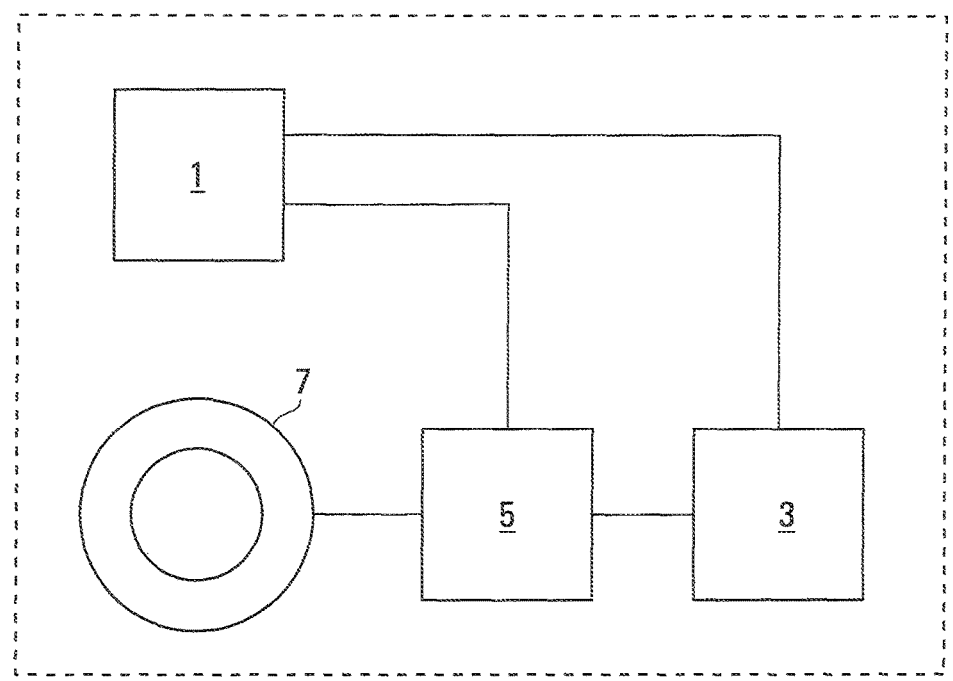
FIG. 4 is a schematic diagram of an embodiment of the tire air pressure deflation system.
Figure 5:
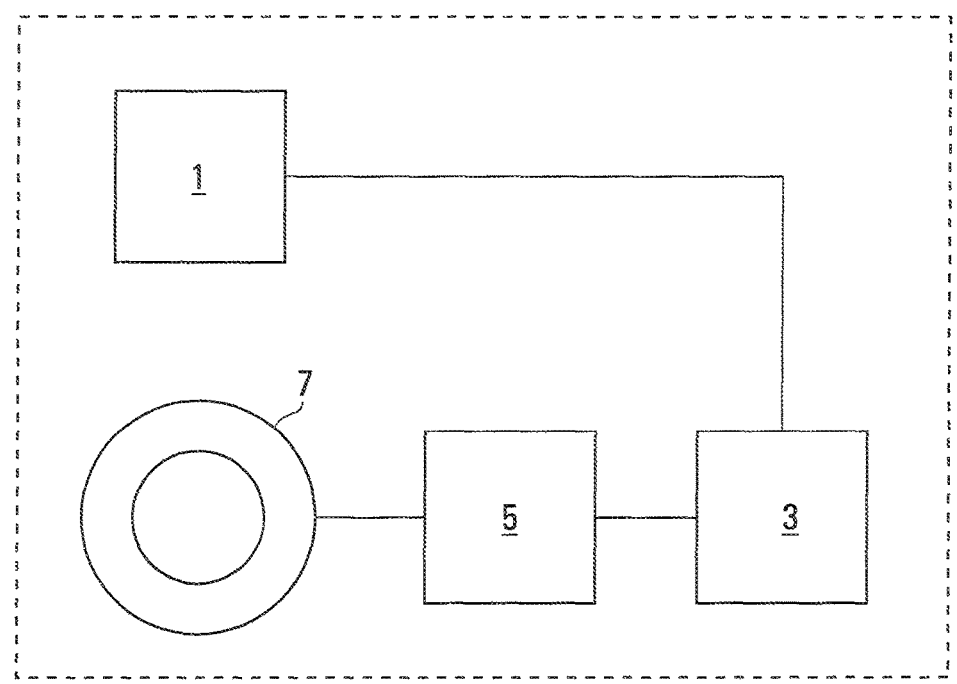
FIG. 5 is a schematic diagram of an embodiment of the tire air pressure deflation system.

The system may further comprise sensors reading pressures of various elements of the system. The sensors may feed back to the control box to provide information on system performance to the operator. The sensors may feed back to the communication board. The dashed lines in FIG. 2 depict components that sensors may provide communication between.

In order to set timing on deflation the following steps may be taken; 1)determine manufacturer tire specifications based on weight and speed, 2) determine the average time of deflation from current PSI to desired PSI, 3) set full release to active pressure below desired PSI 4) time deflation and stop deflation attune to deflate to desired PSI, 5) inflate to desired PSI if PSI has dropped below during deflation.

The air inflation deflation system may be removably mounted on the vehicle to allow for the operator to move the components of the system to other locations on the vehicle, or to remove the system and mount it on a different vehicle with ease.

When an embodiment of the invention is in operation, the air compressor (11) feeds the air storage tank (13). The air storage tank feeds the relay valve (53) of the air delivery system (5) and the air storage tank feeds the air control system (3). The air supply into the air control system may feed through a filter and then through a control valve, set to the desired system pressure. The control valve allows the desired air pressure to the reference air tank. The reference air tank feeds a pilot valve to the reference pressure tube (31), the reference air tube in gas communication with the relay valve (53), dictating the pressure maintained by the air delivery system (5). If the pressure set by the air control system (3) is below the pressure of the air delivery system (5), the relay valve will expel air from relay tube (51) to achieve the pressure setting of the air control system (3). The new relay tube pressure, in gas communication with the quick release valve (55), will cause the quick release valve to expel air from the tire through the valve stem and out the quick release valve port to achieve a tire pressure consistent with the pressure of the relay tube (51) and the air control system (3).

If the pressure set by the air control system is above the pressure of the air delivery system, the relay valve will allow air from the air storage tank to pass through the relay valve, into the relay tube (51) of the air delivery system to reach a pressure consistent with the pressure of the air control system. The quick release valve will then allow air from the relay tube (51) to flow to the tire until the tire pressure is consistent with the pressure of the relay tube (51) and the air control system (3).

In an alternative embodiment, the system may be set to enhance the speed at which a vehicle tire or tires are inflated.

In this embodiment, the finishing pressure is set above the starting pressure, and the active pressure is set above the finishing pressure.

While the invention has been described in connection with specific embodiments thereof, it will be understood that the scope of the claims should not be limited by the preferred embodiments set forth in the examples, but should be given the broadest interpretation consistent with the description as a whole.

We claim:

1. A tire air pressure deflation system comprising:
    a) an air delivery system, having gas communication with at least one vehicle tire, the air delivery system maintaining a the desired tire pressure, and
    b) an adjustable air control system adapted to control the an air pressure maintained in the air delivery system and supply or expel the air from the tire, the air control system having a starting pressure setting, and a finishing pressure setting lower than the starting pressure setting, the finishing pressure setting having an active pressure setting lower than the finishing pressure setting, and,
    c) an air supply system being in gas communication with the air control system to feed a reference tank within the air control system, the reference tank being in gas communication with a pilot valve which normalizes a pressure between the air delivery system and the at least one tire of a vehicle,
    whereby upon activation of the tire air pressure deflation system, the tire deflates to the active pressure setting and the air control system deactivates upon reaching the finishing pressure setting.

2. The tire air pressure deflation system of claim 1 whereby the air control system controls the air pressure maintained in the air delivery system by setting a the pressure of a relay valve.

3. The tire air pressure deflation system of claim 1 further comprising an wherein the air supply system is in gas communication with the air delivery system supplying air to the air delivery system in order to inflate the tire.

4. The tire air pressure deflation system of claim 1 whereby a valve is located between the air delivery system and the tire to decrease the distance the air must travel to exhaust from the tire and the tire air pressure deflation system.

5. The tire air pressure deflation system of claim 1 whereby the control system further comprises a switch that is located in close proximity to the operator of the vehicle, the switch for controlling the activation and deactivation of the tire air pressure deflation system.

6. The tire air pressure deflation system of claim 1 whereby the finishing pressure provides reduced field compaction from tires the at least one tire relative to the starting pressure.

7. The tire air pressure deflation system of claim 1 whereby a sensor is in communication with the tire pressure to dictate when the air control system switches from active pressure to finishing pressure.

8. The tire air pressure deflation system of claim 1 whereby the a deflation time is programmed into the air control system allowing the air control system to determine when to switch from the active pressure to the finishing pressure based on the time required to deflate the tire from the starting to the finishing pressure.

9. The tire air pressure deflation system of claim 1 whereby the active pressure is below the finishing pressure by at least 5 PSI.

* * * * *